US010332163B2

(12) United States Patent
Wiesmuller et al.

(10) Patent No.: US 10,332,163 B2
(45) Date of Patent: Jun. 25, 2019

(54) SYSTEM AND METHOD FOR PROVIDING COMMERCIAL SERVICES OVER A WIRELESS COMMUNICATION NETWORK

(75) Inventors: Andreas Wiesmuller, Vienna (AT); Ben Goodspeed, Greenwich, CT (US); Alois Langmeier, Vienna (AT); Reinhard Tschaickner, Vienna (AT)

(73) Assignee: Syniverse ICX Corporation, Tampa, FL (US)

( * ) Notice: Subject to any disclaimer, the term of this patent is extended or adjusted under 35 U.S.C. 154(b) by 1163 days.

(21) Appl. No.: 12/272,566

(22) Filed: Nov. 17, 2008

(65) Prior Publication Data

US 2009/0069040 A1 Mar. 12, 2009

Related U.S. Application Data

(62) Division of application No. 10/722,821, filed on Nov. 25, 2003, now abandoned.

(Continued)

(51) Int. Cl.
*G06Q 30/06* (2012.01)
*G06Q 20/04* (2012.01)
(Continued)

(52) U.S. Cl.
CPC ............ *G06Q 30/06* (2013.01); *G06Q 20/04* (2013.01); *G06Q 20/045* (2013.01); *G06Q 20/12* (2013.01);
(Continued)

(58) Field of Classification Search
USPC ..................................... 705/14.1, 25, 26, 64
See application file for complete search history.

(56) References Cited

U.S. PATENT DOCUMENTS 5,546,530 A    8/1996   Grimaud
5,984,508 A * 11/1999   Hurley .................... G06F 21/10
                                                                      700/234

(Continued)

OTHER PUBLICATIONS

Schwiderski-Grosche et al (Secure mobile commerce) (Year: 2002).*

*Primary Examiner* — Mamon Obeid
(74) *Attorney, Agent, or Firm* — Andriy Lytvyn; Smith & Hopen, P.A.

(57) ABSTRACT

The inventive system provides real-time commercial services to users of mobile communication devices (MCDs) over a wireless communication network utilizing the short message service protocol (SMS). The inventive system establishes a dialog with a user of an MCD utilizing SMS to present the user with commercial service options and to allow the user to quickly and easily purchase the services by sending minimal SMS responses during the dialog process. Preferably, prior to utilization of the inventive system, the user subscribes with a service provider to pre-arrange payment options for purchased services, to provide information helpful in tailoring offered services and service options to the user, and optionally to receive enhanced services (such as discounted and/or last minute offers, etc.). Utilization of the inventive system occurs in three phases: trigger, purchase and claim. During the trigger phase (user or service provider initiated), the service to be purchased is selected. During the purchase phase, the user selects the grade and quantity of services to be purchased and authorizes payment which is processed by the service provider and thereafter receives a unique service code. During the claim phase, the user presents the service code at the service location, which is then verified using a local terminal, and the service is then delivered to the user. The inventive dialog process can be advantageously and readily configured for a wide variety of (Continued)

commercial services, including, but not limited to entertainment site admissions and travel.

20 Claims, 8 Drawing Sheets

Related U.S. Application Data

(60) Provisional application No. 60/490,752, filed on Jul. 29, 2003.

(51) Int. Cl.
*G06Q 20/12* (2012.01)
*G06Q 20/32* (2012.01)
*G06Q 50/18* (2012.01)
*G07F 17/42* (2006.01)
*H04L 12/58* (2006.01)

(52) U.S. Cl.
CPC ......... *G06Q 20/32* (2013.01); *G06Q 20/3255* (2013.01); *G06Q 30/0601* (2013.01); *G06Q 30/0625* (2013.01); *G06Q 50/188* (2013.01); *G07F 17/42* (2013.01); *H04L 51/38* (2013.01)

(56) References Cited

U.S. PATENT DOCUMENTS

| | | | | |
|---|---|---|---|---|
| 6,085,976 A * | 7/2000 | Sehr | ................. | G06Q 10/02 235/380 |
| 6,173,209 B1 * | 1/2001 | Laval | ................. | G06Q 10/02 235/382 |
| 6,243,691 B1 * | 6/2001 | Fisher | ................. | G06Q 30/0601 705/26.3 |
| 6,363,351 B1 * | 3/2002 | Moro | ................. | G06Q 10/02 235/380 |
| 6,424,841 B1 * | 7/2002 | Gustafsson | ............. | H04W 4/14 455/417 |
| 6,446,045 B1 * | 9/2002 | Stone | ................. | G06Q 10/00 705/26.1 |
| 6,484,182 B1 * | 11/2002 | Dunphy | ................. | G06Q 10/06 707/999.102 |
| 6,842,741 B1 * | 1/2005 | Fujimura | ............. | G06Q 20/342 705/1.1 |
| 6,907,239 B1 | 6/2005 | Sivula | | |
| 6,961,858 B2 * | 11/2005 | Fransdonk | ............. | G06F 21/10 380/281 |
| 7,020,635 B2 * | 3/2006 | Hamilton | ............. | G06Q 20/00 705/51 |
| 7,027,808 B2 | 4/2006 | Wesby | | |
| 7,080,049 B2 * | 7/2006 | Truitt | ................. | G06Q 20/16 380/30 |
| 7,090,128 B2 * | 8/2006 | Farley | ................. | H04L 67/2823 235/384 |
| 7,107,462 B2 * | 9/2006 | Fransdonk | ............. | G06Q 20/12 380/282 |
| 7,150,045 B2 * | 12/2006 | Koelle | ................. | G06F 21/552 726/26 |
| 7,212,983 B2 * | 5/2007 | Redmann | ............. | G06Q 10/02 705/6 |
| 7,225,160 B2 * | 5/2007 | Stefik | ................. | G06F 21/10 375/E7.009 |
| 7,315,823 B2 * | 1/2008 | Brondrup | ............. | G06Q 10/02 705/5 |
| 7,343,317 B2 * | 3/2008 | Jokinen et al. | ............. | 705/14.64 |
| 7,395,244 B1 * | 7/2008 | Kingsford | ............. | G06Q 10/06 705/52 |
| 7,496,527 B2 * | 2/2009 | Silverstein et al. | ......... | 705/26.8 |
| 7,523,071 B2 * | 4/2009 | Fox | ................. | G06Q 30/06 705/52 |
| 7,587,502 B2 * | 9/2009 | Crawford | ............. | A63F 13/12 463/42 |
| 7,711,586 B2 * | 5/2010 | Aggarwal | ............. | G06Q 10/02 700/14 |
| 7,769,633 B2 * | 8/2010 | Jokinen et al. | ............. | 705/14.4 |
| 7,870,077 B2 * | 1/2011 | Woo et al. | ................. | 705/78 |
| 8,122,119 B1 * | 2/2012 | Green | ................. | G06F 21/10 709/224 |
| 8,538,881 B2 * | 9/2013 | Weiss | ................. | G06F 21/32 705/42 |
| 2001/0049636 A1 * | 12/2001 | Hudda | ................. | G06Q 30/06 705/26.1 |
| 2002/0032641 A1 * | 3/2002 | Mendiola | ............. | G06Q 30/0267 705/37 |
| 2002/0049658 A1 * | 4/2002 | Davidson | ............. | G06Q 40/04 705/37 |
| 2002/0060246 A1 | 5/2002 | Gobburu et al. | | |
| 2002/0077993 A1 | 6/2002 | Immonen et al. | | |
| 2002/0119793 A1 * | 8/2002 | Hronek et al. | ................. | 455/466 |
| 2002/0123359 A1 * | 9/2002 | Wei | ................. | H04L 29/06 455/466 |
| 2002/0143995 A1 | 10/2002 | Yeh | | |
| 2002/0159600 A1 * | 10/2002 | Weiner | ................. | 380/270 |
| 2003/0004834 A1 * | 1/2003 | Yamazaki | ............. | G06Q 20/02 705/26.1 |
| 2003/0007464 A1 * | 1/2003 | Balani | ................. | G06Q 30/0601 370/310 |
| 2003/0083989 A1 * | 5/2003 | Dougall | ............. | G06Q 20/102 705/40 |
| 2003/0123669 A1 * | 7/2003 | Koukoulidis et al. | ......... | 380/281 |
| 2003/0171993 A1 * | 9/2003 | Chappuis | ............. | 705/16 |
| 2004/0006538 A1 * | 1/2004 | Steinberg et al. | ............. | 705/39 |
| 2004/0054560 A1 * | 3/2004 | Levionnais et al. | ............. | 705/5 |
| 2004/0103040 A1 | 5/2004 | Ronaghi et al. | | |
| 2004/0215526 A1 * | 10/2004 | Luo | ................. | G06Q 30/06 705/26.1 |
| 2005/0021364 A1 * | 1/2005 | Nakfoor | ............. | G06F 21/33 235/382 |
| 2005/0027608 A1 * | 2/2005 | Wiesmuller | ........... | G06Q 20/04 705/80 |
| 2005/0071238 A1 * | 3/2005 | Guillot | ............. | 705/26 |
| 2005/0113139 A1 * | 5/2005 | Boss | ................. | H04W 8/22 455/558 |
| 2005/0129235 A1 * | 6/2005 | Little et al. | ................. | 380/255 |
| 2006/0121889 A1 * | 6/2006 | Contreras Alvarez | ............. | H04M 1/72552 455/414.1 |
| 2006/0248020 A1 * | 11/2006 | Robinson | ............. | G06Q 20/04 705/69 |
| 2007/0016533 A1 * | 1/2007 | Fujimura | ............. | G06Q 20/342 705/65 |
| 2007/0198436 A1 * | 8/2007 | Weiss | ................. | G06F 21/32 705/75 |
| 2008/0010213 A1 * | 1/2008 | Roth | ................. | G06Q 10/02 705/65 |
| 2008/0096594 A1 * | 4/2008 | Vinding | ............. | H04L 51/38 455/466 |
| 2008/0189776 A1 * | 8/2008 | Constable | ............. | G06F 21/32 726/7 |
| 2008/0268882 A1 * | 10/2008 | Moloney | ............. | 455/466 |
| 2009/0069040 A1 * | 3/2009 | Wiesmuller | ............. | G06Q 20/04 455/466 |
| 2009/0248504 A1 * | 10/2009 | Thomas | ............. | G06Q 30/02 705/14.1 |
| 2012/0203568 A1 * | 8/2012 | Francis | ................. | G06Q 30/06 705/2 |
| 2014/0025408 A1 * | 1/2014 | Ritter | ................. | G06Q 10/02 705/5 |
| 2014/0279458 A1 * | 9/2014 | Holman | ............. | G06Q 20/227 705/40 |
| 2014/0328250 A1 * | 11/2014 | Hardy | ................. | H04W 12/08 370/328 |
| 2015/0039453 A1 * | 2/2015 | Musser | ................. | G06Q 20/20 705/16 |
| 2015/0081561 A1 * | 3/2015 | Musser | ............. | G06Q 20/1085 705/44 |
| 2018/0246983 A1 * | 8/2018 | Rathod | ................. | H04L 63/102 |

\* cited by examiner (Example)

FIG. 7 (Example)

(Example)

SYSTEM AND METHOD FOR PROVIDING COMMERCIAL SERVICES OVER A WIRELESS COMMUNICATION NETWORK

CROSS-REFERENCES TO RELATED APPLICATIONS

The present patent application claims priority from the commonly assigned U.S. provisional patent application Ser. No. 60/490,752 entitled "System and Method for Providing Commercial Services over a Wireless Communication Network" filed Jul. 29, 2003 and is a divisional application of U.S. Ser. No. 10/722,821 entitled "System and Method for Providing Commercial Services Over a Wireless Communication Network" filed Nov. 25, 2003, both of which are hereby incorporated in their entirety.

FIELD OF THE INVENTION

The present invention relates generally to a mobile communication system for providing services over a wireless communication network and more particularly to a data processing and communication system for providing commercial services, over a wireless communication network, to users of mobile communication devices.

BACKGROUND OF THE INVENTION

In the past decade, mobile communication devices (hereinafter "MCDs"), such as cellular telephones and pagers have taken the world by storm. While voice communication and text messaging remains the dominant area of utilization, in recent years there has been a proliferation of additional services that are offered to users of MCDs by various service providers. These services range from delivery of news or other information in text format, to full interactive services (Internet-based and otherwise), such as web-browsing and games. In most cases, such commercial services are implemented through utilization of the Wireless Application Protocol ("WAP"), which serves as a secure specification for allowing users to access information and utilize interactive services through their MCD. In essence WAP enables utilization of an MCD to access Internet content and services. WAP is advantageous over previously used MCD access techniques because it provides optimization of web-based applications for access by WAP-enables MCDs, taking into account the limited processing power, screen size, and bandwidth of a typical MCD.

However, while WAP is a robust standard and generally works well for utilization of an MCD to access the Internet, it still suffers from a number of drawbacks in the field of provision of interactive commercial services. First, WAP-based applications must be developed, maintained, and operated at a significant expense to service providers. Second, utilization of a WAP-based commercial service involves considerable involvement from a user to navigate through multiple screens of a WAP application, which is often difficult and time-consuming to do using an MCD. This in turn minimizes the opportunity of providing and stimulating impulse purchasing and/or orders from users. Third, WAP requires significant bandwidth and a good communication connection, making utilization of WAP-based services in areas with relatively poor network coverage difficult and frustrating for users.

In the past decade, a different standard for binary and text-based communication over wireless networks has emerged and is in the process of gaining tremendous popularity among both network service providers and users. This standard is called Short Message Service (SMS), initially established over ten years ago as a one way communication platform where operators could send notification messages to their customers, for example to state that the customer has voice mail. SMS, which has evolved into a popular person to person communication format, now enables quick and easy sending and receiving of short text messages (for example around 160 characters in the GSM standard) by MCD users. Typically the cost of sending and/or receiving SMS messages is very small to the user, making SMS a great option for cheap, fast, and efficient communication that is generally less expensive than voice communication. Furthermore, SMS is even more reliable in poor coverage areas than voice communication, due to the fact that SMS communication is queued, and is certainly more reliable than WAP.

It would thus be desirable to provide a platform that utilizes SMS for providing robust commercial services to users of MCDs. It would further be desirable to provide SMS-based commercial services that are inexpensive to design, develop, and maintain. It would also be desirable to provide SMS-based commercial services that are easy for the MCD users to utilize and that encourage impulse orders and purchases.

BRIEF SUMMARY OF THE INVENTION

The present invention is directed to a novel system that provides commercial services, over a wireless communication network, to users of mobile communication devices using through a simplified SMS dialog process. In summary, the inventive system establishes a dialog with a user of a mobile communication device (MCD) utilizing SMS to present the user with commercial service options and to allow the user to quickly and easily purchase the services by sending minimal SMS responses during the dialog process.

Preferably, prior to utilization of the inventive system, the user subscribes with a service provider to pre-arrange payment options for purchased services, to provide information helpful in tailoring offered services and service options to the user, to select default values for various services to simplify the dialog process, and optionally to receive enhanced services (such as discounted and/or last minute offers, etc.).

Essentially, utilization of the inventive system occurs in three phases: trigger, purchase and claim. During the trigger phase, which may be initiated by the user or by the service provider transmitting an offer to the user, the service to be purchased is selected. During the purchase phase, the user selects the grade and quantity of services to be purchased (for example, the number and type of event tickets) and authorizes payment which is processed by the service provider. During the purchase phase, the user also receives a unique service code which is later utilized to claim the purchased service at the service location. During the claim phase, the user presents the service code at the service location (for example at an event hall), which is then verified using a local terminal, and the service is then delivered to the user (for example, the user is admitted to the event). The flexibility and ease of use of the inventive dialog process enables its utilization for a wide variety of commercial services, including, but not limited to entertainment site admissions, and travel.

The inventive system includes a wireless communication network that enables a service system to communicate with one or more users' MCDs via a gateway that translates SMS messages into electronic files and routs them to appropriate destinations (and vice versa). The service system executes one or more inventive control programs and program modules to control and interact with at least a portion of the other components of the inventive system and also stores data related to operation of the system (for example user information databases, software for provision of various commercial services, etc.). The service system is optionally connected to external payment system(s). While the service system can include internal payment processing capabilities, connection to the optional external payment system(s) enables the user to have multiple payment options. Thus, the service system serves to trigger the purchase of the service, in response to a user's request or in response to an offer sent to the user and to complete the purchase of the service.

The service system may be administered and managed by a service manager, for example, a company contracted by one or more third party service providers to provide their services through the inventive system. The service manager may be an independent entity or it may be a mobile service provider who also controls the wireless communication network and/or the gateway.

Optionally, the service system can work in conjunction with one or more connected additional third party systems. Alternately, the service system may be implemented in third party computer systems utilizing existing hardware (i.e. servers, data storage) to execute the inventive control program. In this case, the third parties directly manage and administer provision of their services to the user.

The service system is also connected to one or more remote systems, for enabling users to claim purchased services. For most services, remote system preferably resides at the location at which a purchased service is claimed. Thus each remote system corresponds to a different location for delivery of one or more types of services. For example, the service system may be connected to a large number of remote systems at various movie theaters, concert halls, amusement parks, airports, bus terminals, etc.

One or more remote terminals, for administrating the claim phase of the service provision process, are connected to the remote system. The number of the remote terminals at a particular location is determined as a matter of design choice based on the type of service offered and necessary capacity and throughput.

In conclusion, the service system, alone or in conjunction with additional systems, handles the subscription process, alone or in conjunction with payment systems, handles the purchase phase, while the remote terminals, alone or in conjunction with remote systems and/or the service system handle the claim phase.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF THE INVENTION

Figure 1:
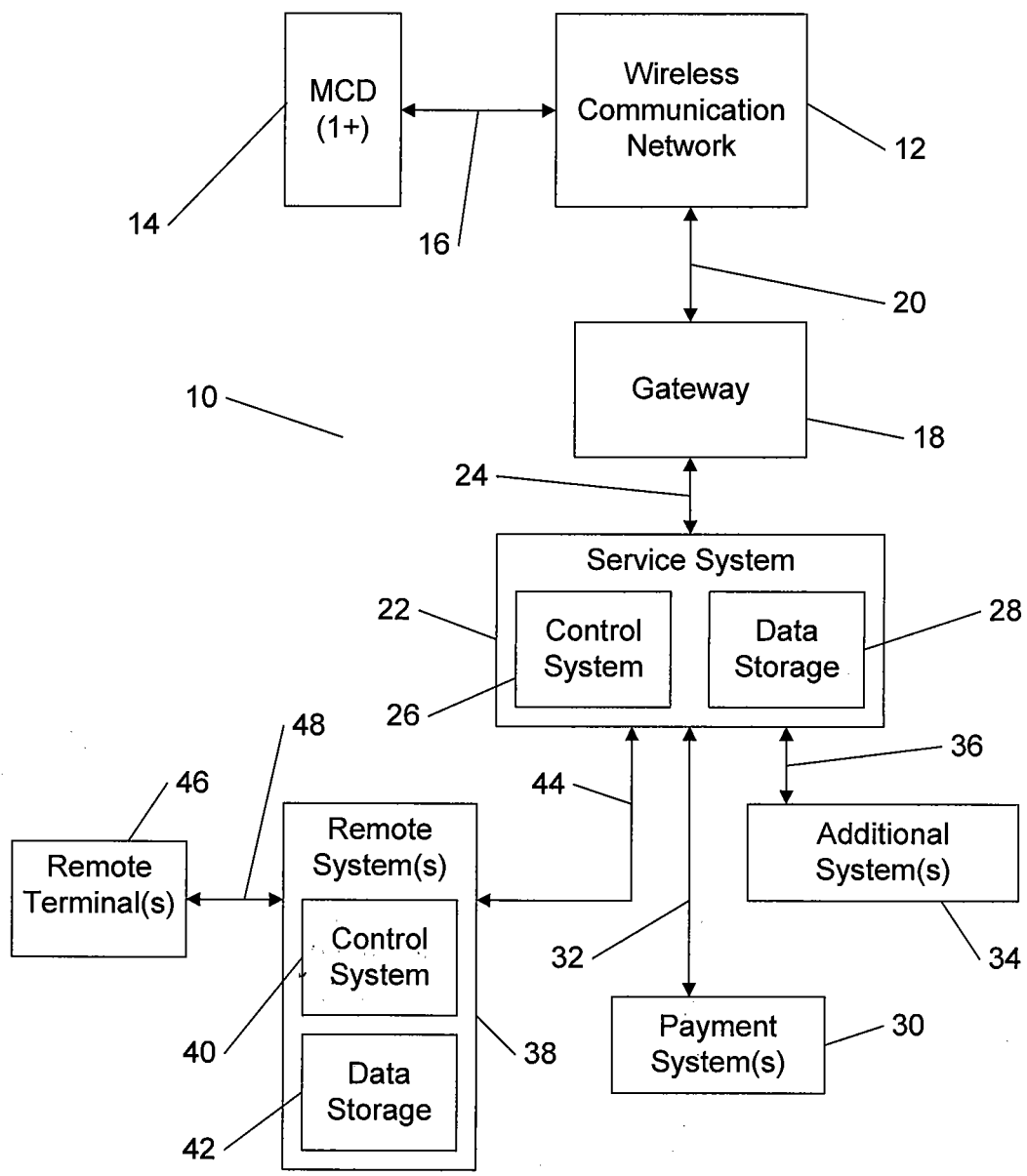
FIG. 1 is a block diagram showing exemplary components of the inventive wireless commercial service system.

The system and method of the present invention remedy the disadvantages of previously known systems for providing commercial services over a wireless communication network. The inventive system provides one or more different real-time commercial services to users of mobile communication devices (MCDS) over a wireless communication network utilizing the short message service protocol (SMS). While the inventive system is described as advantageously utilizing the SMS standard, it should be understood to one skilled in the art, that the inventive system may utilize WAP and related systems (i.e. WAP gateways, etc.) without departing from the spirit of the invention as a matter of necessity or design choice. Furthermore, the multimedia message service (MMS) can also be readily utilized instead of or in addition to SMS, for example, providing additional or enhanced content during operation of the inventive system, as a matter of design choice without departing from the spirit of the invention. Thus, for the purposes of the present invention, it should be understood that any reference made to SMS below, also applies to MMS.

As described in greater detail below in connection with FIG. 2, the essence of the inventive system is establishing a dialog with a user of an MCD utilizing SMS to present the user with commercial service options and to allow the user to quickly and easily purchase the services by sending minimal SMS responses during the dialog process. Preferably, prior to utilization of the inventive system, the user subscribes to a service provider to pre-arrange payment options for purchased services, to select default values for various services to simplify the dialog process, to provide information helpful in tailoring offered services and service options to the user, and optionally to receive enhanced services (such as discounted and/or last minute offers, etc.). In summary, utilization of the inventive system occurs in three phases: trigger, purchase and claim. During the trigger phase, which may be initiated by the user or by the service provider transmitting an offer to the user, the service to be purchased is selected. During the purchase phase, the user selects the grade and quantity of services to be purchased (for example, the number and type of event tickets) and authorizes payment which is processed by the service provider. During the purchase phase, the user also receives a unique service code which is later utilized to claim the purchased service at the service location. During the claim phase, the user presents the service code at the service location (for example at an event hall), which is then verified using a local terminal, and the service is then delivered to the user (for example, the user is admitted to the event). The flexibility and ease of use of the inventive dialog process enables its utilization for a wide variety of commercial services, including, but not limited to entertainment site admissions and travel.

The inventive system may be readily applied to provide a wide variety of commercial services to the users. For example, the inventive system enables the users to purchase tickets for various events, including but not limited to: movies, concerts, cultural events (theater, opera, museums, performance art), sporting events, zoos, amusement parks, or premium speaking engagements. Similarly, the inventive system can also readily enable the users to purchase travel services of all kinds, including but not limited to: travel tickets (airline, train, bus, ship), car rentals, hotel rooms, and parking. It should be noted that purchase of any other type of commercial services may be readily implemented using the inventive system without departing from the spirit of the invention. It should also be noted that for some types of services utilization of MMS may be advantageous in that enhanced content may be provided to the user in conjunction with an offer or purchase of a service. For example, an offer to purchase concert tickets may include a sound clip of an artist's music or a picture of an album cover, while when purchasing parking time, the user may use MMS to link to a traffic camera to view their car in the parking lot.

Referring now to FIG. 1, an exemplary embodiment of the present invention is shown as a system 10. The system 10 includes a wireless communication network 12 for providing wireless communication services over a wireless communication link 16 to one or more mobile communication devices (MCDs) 14. The wireless communication network 12 may be one or more commonly known commercial mobile service provider networks capable of routing SMS messages.

While only a single MCD is shown, it should be understood that the amount of MCDs that are capable of simultaneously utilizing the system 10 is limited only by the capacity of the wireless network 12 and capacity of other hardware system 10 components described below. The MCD 14 may be any mobile communication device that supports SMS services having a screen (not shown) for displaying SMS messages and an input device (such as a keypad, touch panel, or a voice input unit—not shown), for entering SMS messages. For example, the MCD 14 may be a cellular telephone, a personal digital assistant (PDA), or a combination of the two. Optionally, the MCD 14 can be implemented as a virtual device in a limited mobility (i.e. notebook) or desktop computer, utilizing instant message software functions of the computer to emulate SMS dialog.

The system 10 includes at least one gateway 18, for receiving wireless SMS messages from the MCD, through the wireless communication network 12 via a communication link 20, converting them to an electronic message form that can be transmitted and processed by a conventional computer system, and then routing the converted SMS message to a service system 22 via a communication link 24. While only a single gateway 18 is shown, it should be understood that multiple gateways may be readily utilized to provide broad geographical coverage to ensure that SMS messages sent from any MCD 14 location are picked up and properly routed. The communication link 24 is preferably a high speed broadband connection (for example the Internet, an intranet, a local area network (LAN), a wide are network (WAN), or a broadband high speed line (T1/T3, etc.)). Optionally, the communication link 24 may be a high speed wireless communication link.

The service system 22 is preferably a computer system capable of simultaneously processing data received from multiple sources and capable of high speed communication with other remote computer systems. At the very least, the service system includes a control system 26, for controlling operation of the service system 22 and for executing one or more inventive control programs and program modules to control and interact with at least a portion of the other components of the system 10, and a data storage system 28 for storing data related to operation of the system 10 (for example user information databases, software for provision of various commercial services, etc.). The control system 26 may be a server or group of interconnected servers, equipped with conventional peripherals (display, input system, communication system, etc.), while the data storage system 28 may be any high capacity secure data storage system, such as magnetic or optical drives.

The service system 22 is optionally connected to an external payment system (or systems) 30 via a secure communication link 32. While the service system 22 can include internal payment processing capabilities (for example direct billing to the user's MCD account or via a pre-paid plan), connection to the optional external payment system(s) 30 enables the user to have payment options such as credit or debit card, direct debit, pay box, or via other means. Thus, the payment system(s) 30 may be a bank, a credit card processor, or the like. Preferably, the communication link is secure (or at least data sent to and from the payment system 30 is encrypted) to protect user's confidential financial information.

The service system 22 may be administered and managed by a service manager, for example, a company contracted by one or more third party service providers to provide their services through the inventive system 10. The service manager may be an independent entity or it may be a mobile service provider who also controls the wireless communication network 12 and/or the gateway 18. Optionally, the service system 22 can work in conjunction with one or more additional third party systems 34, linked through a communication link 36. For example, part of the data storage system 28 that stores user information, can reside in a third party system 34. This can be advantageous if the user information is especially confidential, such as when the service provider is a government agency (e.g. a municipality providing parking services). In this case, the service system 22 works in conjunction with the additional system 34 to execute the inventive control program (an example of which is further described below in connection with FIGS. 3-5 and 7-8) and program modules to provide services to the user. Alternately, the service system 22 may be implemented in third party computer systems utilizing existing hardware (i.e. servers, data storage) to execute the inventive control program. In this case, the third parties directly manage and administer provision of their services to the user. In accordance with the present invention, one or more of the configurations described above can be used alone or in combination in the inventive system 10, as a matter of design choice without departing from the present invention.

It should also be noted that, as a matter of design choice, multiple service systems 22 may be utilized in same or different geographic locations to simultaneously provide a variety of commercial services from a variety of different service providers. Optionally, some of the services may be provided over different wireless communication networks. Optionally, the service system 22 can be configured to execute multiple control programs to simultaneously provide services from different service providers.

The service system 22 is further advantageous in that it enables service managers and service providers to readily gather and analyze aggregate data from purchased services. For example, concert attendance and parking patterns in a municipality may be analyzed and tracked.

The service system 22 is also connected to one or more remote systems 38, for enabling users to claim purchased services, via a communication link 44 (which may be wireless or wired). For most services, remote system 38 preferably resides at the location at which a purchased service is claimed. For example, if the service is event tickets, the remote system 38 is located at the event venue, while if the service is airline tickets, the remote system 38 is located at the airport terminal. The remote system 38, which may be a conventional computer system having conventional peripherals, preferably includes a control system 40 (such as a workstation, a server, or a group of servers) for controlling the operation of the remote system 38, and a data storage system 42 for storing service-related data locally. Each remote system 38 corresponds to a different location for delivery of one or more types of services. For example, the service system 22 may be connected to a large number of remote systems 38 at various movie theaters, concert halls, amusement parks, airports, bus terminals, etc.

One or more remote terminals 46, for administrating the claim phase of the service provision process, are connected to the remote system 38 via a communication link 48. The number of the remote terminals 46 at a particular location is determined as a matter of design choice based on the type of service offered and necessary capacity and throughput. For example, at a small theater only one remote terminal 46 may be necessary, while at a large concert hall, more than a dozen may be necessary (for example one for each entry point). Preferably, the remote terminals 46 are robust MCDs (for example wireless PDAs), but they may be conventional cell phones or standard wired workstation-type terminals (for example existing workstation at a ticket counter). Thus, the communication link 48 may be wireless (when the remote terminals 46 are MCDS) or wired (when the remote terminals 46 are workstations). Optionally different types of remote terminals 46 may be utilized in conjunction with one another. For example, a concert hall may have several remote terminal 46 workstations at ticket counters, and multiple remote terminal 46 MCDs carried by gate ushers stationed at various entry points.

In an alternate embodiment of the present invention, the remote system 38 is eliminated and the remote terminals 46 may communicate with the service system 22 directly (i.e. via a wireless link to the gateway 18). This may be advantageous when the location at which the services are claimed can vary (for example if the services are purchased parking time) or for very small event venues for which having a remote system 38 is impractical. The operation of the remote system(s) 38 and the remote terminal(s) 46 is described in greater detail below in connection with FIGS. 2, 3 and 5.

Figure 2:
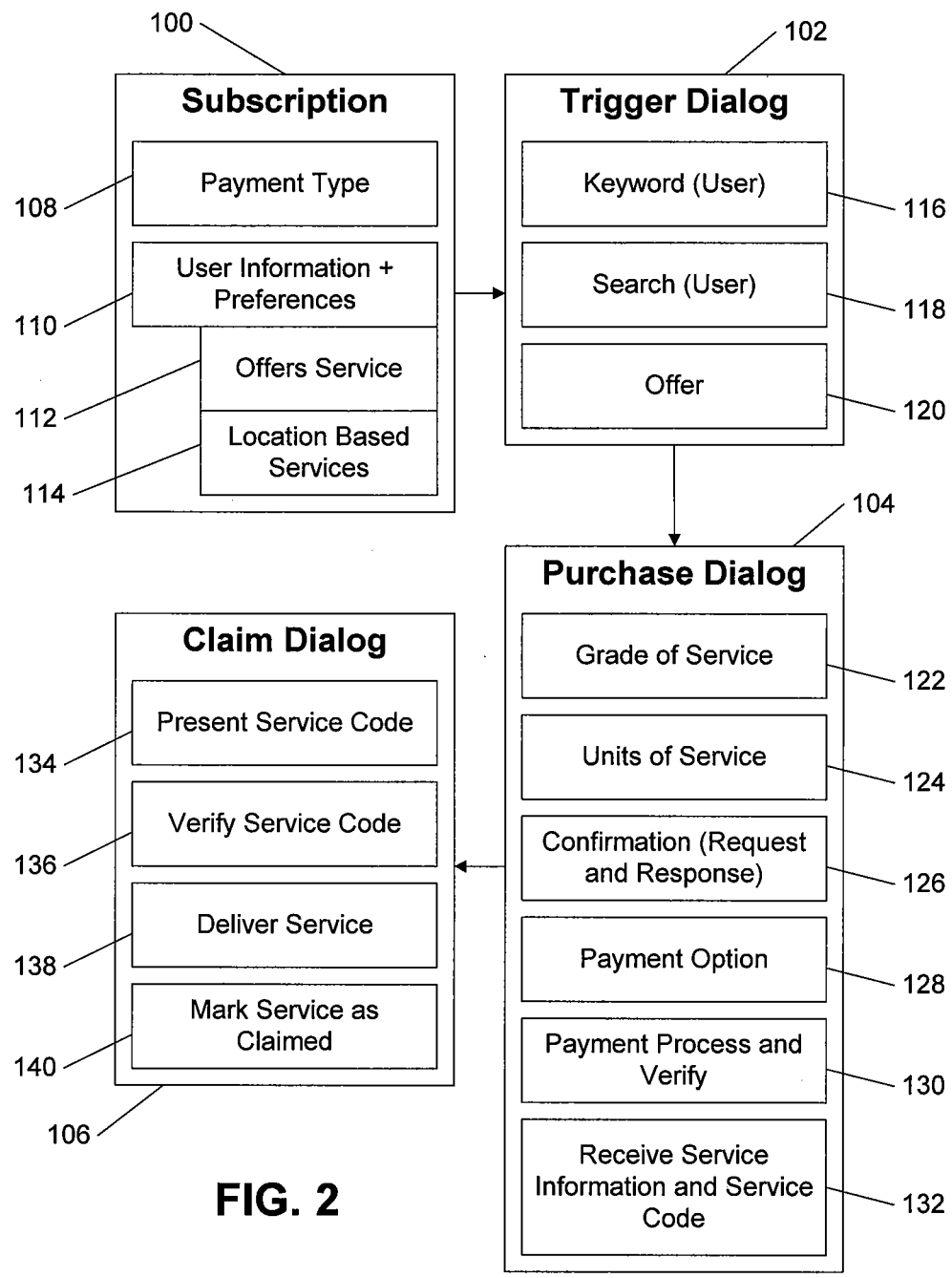
FIG. 2 is a function diagram showing exemplary functions and dialog process executed in conjunction with the inventive wireless commercial service system of FIG. 1.

Referring now to FIG. 2, it would be helpful to describe the subscription process and the various dialog phases of utilization of the inventive system 10. Preferably, prior to utilizing the inventive system 10, the user completes a subscription process 100. Thereafter the system 10 may be utilized by the user using simple SMS dialog at any time in three phases—a trigger dialog phase 102, a purchase dialog phase 104, and a claim dialog phase 106.

Completing the subscription process 100, is preferably done on-line utilizing a conventional computer system that establishes a communication connection with the service system 22 (for example via the Internet or via the wireless communication network 12). Preferably, the service system 22 provides an easy-to-navigate graphical user interface that assists the user in completing the subscription process 100. Alternately, the subscription process 100 may be performed by the user utilizing the MCD 14, by communicating with a service manager's or provider's customer representative by telephone, or by filling out a form and transmitting it to the service manager or provider by mail or by facsimile.

The main purpose of the subscription process 100, in addition to obtaining necessary user information and preferences, is to enable the user to simplify future use of the system 10 by making as many decisions as is practical in advance. By selecting various default values and preferences in advance, the amount and complexity of various dialogs during phases 102 and 104 may be significantly minimized and certain steps may be eliminated. This is particularly useful for future purchases of travel services where preferences of particular airlines or car rental agencies and car types will greatly simplify the purchase process.

During the subscription process 100, the user selects a preferred payment type (108)—for example, the user may indicate that all payments for services obtained through the system 10 should be billed to the user's MCD account. The user may also select any other payment option, such as credit or debit card, direct bank account debit, pay box, a prepaid service plan, etc. The user may also select whether any particular payment type would be default or whether the user should be prompted during the purchase dialog phase 104 to select a payment type. Optionally, the user may select particular default payment types for various types of services. For example, the user may desire all event services to be billed to their MCD account, while travel services should be billed to a particular credit card.

During the subscription process 100, the user also provides sufficient information (110) for identifying the user and for billing the selected payment types. The user can also select other preferences, such as whether or not the service system 22 should request identity verification prior to processing a service purchase, whether the purchase should be confirmed with the user prior to processing the payment, the preferred grade of service for certain types of services (i.e. always select best orchestra seats or always select least expensive seats), the preferred number of services (i.e. always purchase 2 movie tickets), the user's default location (i.e. a city or borough thereof) and any other preferences that may be offered for selection to the user as a matter of design choice. As part of providing the user information (110), the user may choose to utilize an offers service (112) to "opt-in" to receive, at the MCD 14, various offers from service providers or service managers, for example for one or more of the following:

particular types of events (concerts, movies, etc.)
particular events (predetermined music artists, movies with particular actors or directors,)
discounted services (promotional specials, "last minute" offers, etc.)

special services (may be premium services like pre-sale offers, or offers to sold-out events, etc.)

Optionally, the user may also select location-based services (114) to receive one or more of above-subscribed offers at the MCD 14 based on the user's actual physical location. This enables transmission of offers to the user based on the user's physical proximity to service locations and also simplifies the user's search efforts during the trigger dialog phase 102. For example, the user who opts for location based services may receive an offer to purchase low-priced last minute tickets for an event taking place several streets away from the user. In another example, a user who searches for movie show times (during the trigger dialog phase 102), may automatically be presented with show times for movies in a theater closest to the user's actual geographical location at the time of the search.

The trigger dialog phase 102 initiates the process of providing a service by the inventive system 10 to the user. The trigger phase 102 may be initiated in one of several ways: keyword (116), search (118), or offer (120). Various SMS message keywords for specific services may be advertised and promoted by the service managers or service providers in media (radio, print, television) or on-line. For example, an advertisement may state "Send a message 'JOEC112' to this number to purchase tickets for Joe C's 8 PM show at the Garden Center this Friday." Thus, the user can obtain one or more keywords representative of the desired services from advertising or from other users by word of mouth. The keywords can correspond to varying quantity of predetermined service information. A greater amount of information linked to the keyword results in a more simplified trigger and purchase dialog. For example, a keyword may correspond to an artist and concert location, so that the user may still need to select a time and date for the concert at the trigger phase 102. Alternately, a keyword that corresponds to an artist, location, date and time, can enable the user to enter the purchase phase 104 immediately after transmitting the keyword.

Alternately, the user may utilize a search (118) to find and select a particular service. By entering all or part of a search word, the user may be presented with simplified menus at the MCD 14 which can be navigated with single letter or number responses. In this case having previously selected preferences (during subscription process 102) can simplify the search process for the user. As noted before, a search may also be utilized in conjunction with use of a keyword. The search may be performed by the service system 22 and/or by additional systems 34 (if present). The particular search technology used may be selected as a matter of design choice.

Finally, when the user is sent a particular offer (for example by opting in at (112) during the subscription phase 100), the user can accept the offer and proceed directly to the purchase dialog phase 104. Optionally for certain applications of the inventive system 10, the trigger phase 102 may be completely eliminated, for example as described below in connection with an exemplary parking service system shown in FIGS. 7 and 8. In such cases, the user can initiate the purchase phase 104 directly by simply transmitting the desired units of service to the service system 22.

The purchase dialog phase 104 enables the user to select the quality and quantity of purchased services, to confirm the purchase, to arrange payment for purchased services and to receive information about the purchased services including claim instructions and a unique service code used later during the claim dialog phase 106 to redeem the purchased services at the service location.

To avoid repetition, it should be noted that selection of appropriate preferences during the subscription process 100, can greatly simplify or eliminate some or all of the below described steps. As the purchase phase 104 begins, the user may select the grade of desired service (122), for example the quality of event seats (orchestra, mezzanine, standing room), or the class of travel seats (first class, business class, economy). Optionally, the user may purchase additional bundled services as a higher grade service. For example, the service provider may offer a package—concert tickets and parking at a price lower than if purchased separately.

The user then selects the desired units of service (124) for example by transmitting the number of desired services (e.g. tickets, etc). Optionally, the user is presented with the service price and information and requested to confirm the purchase (126). Assuming, the purchase is confirmed (automatically or by the user), a payment option (128) is selected (automatically or by the user) and the payment is processed (130). Optionally, if the user selected the option, the user's identity may be verified prior to payment processing via a pin-code or a biometric scan if the MCD is equipped with such a device. Finally, the user receives the purchased service information (e.g. confirmation of purchased service, location, etc.) as well as a unique service code (132) used to claim the service some time later at the claim dialog phase 106. Optionally, the user is also provided with instructions on how to receive the service code again if the user accidentally deletes the message.

Optionally, in addition to claiming the purchased service, the unique service code may be used for provision or offer of other commercial services, or discounts on services or products to the user. For example, the unique code can be used as a sweepstakes entry for the user, or used to obtain discounts for parking or dining at locations proximal to where the purchased service is claimed. Alternately, the user may purchase multiple bundled services (for example, concert tickets and parking) under one unique code that may be utilized both for concert admission and for parking.

During the claim dialog phase, the user presents the service code at the service location, the service code is verified, the user is given the service, and the service code is marked as claimed so that it may not be used again. The user may present the service code (134) to service representatives at the service location (for example, gate ushers at a concert or ticketing representatives at an airport) who utilize remote terminals 46 to verify that the user's service code is valid (136). The user may show the screen with the service code to the representative or simply communicate the code verbally.

A database with valid service codes may reside at the service system 22 (i.e. remote terminals 46 can connect to it directly or via the remote system 38) or it may be downloaded prior to the time of scheduled service delivery (i.e. flight time or concert start time) to the remote system 38 that is at the service location. This is advantageous for large scale service provision (i.e. airlines, concert halls, movie theaters) because the service codes can be quickly verified locally and without reliance on the communication link 44. Optionally, if the remote system 38 is not used, the service code database may be downloaded into a remote terminal 46 (for example in a small venue).

After the service code is verified the service is delivered to the user (138), for example in form of boarding passes, admission into an event venue, or provision of a hotel room or rental car. The service is then marked as claimed (140) and the service code is disabled to prevent anyone else from using that code again.

The key features and operation of the inventive system 10 are controlled and configured by the main program executed by the system 10 (for example by the control system 26, FIG. 1). Different steps or program modules of the main program may be executed by different components of the system 10 as a matter of design choice.

Figure 3:
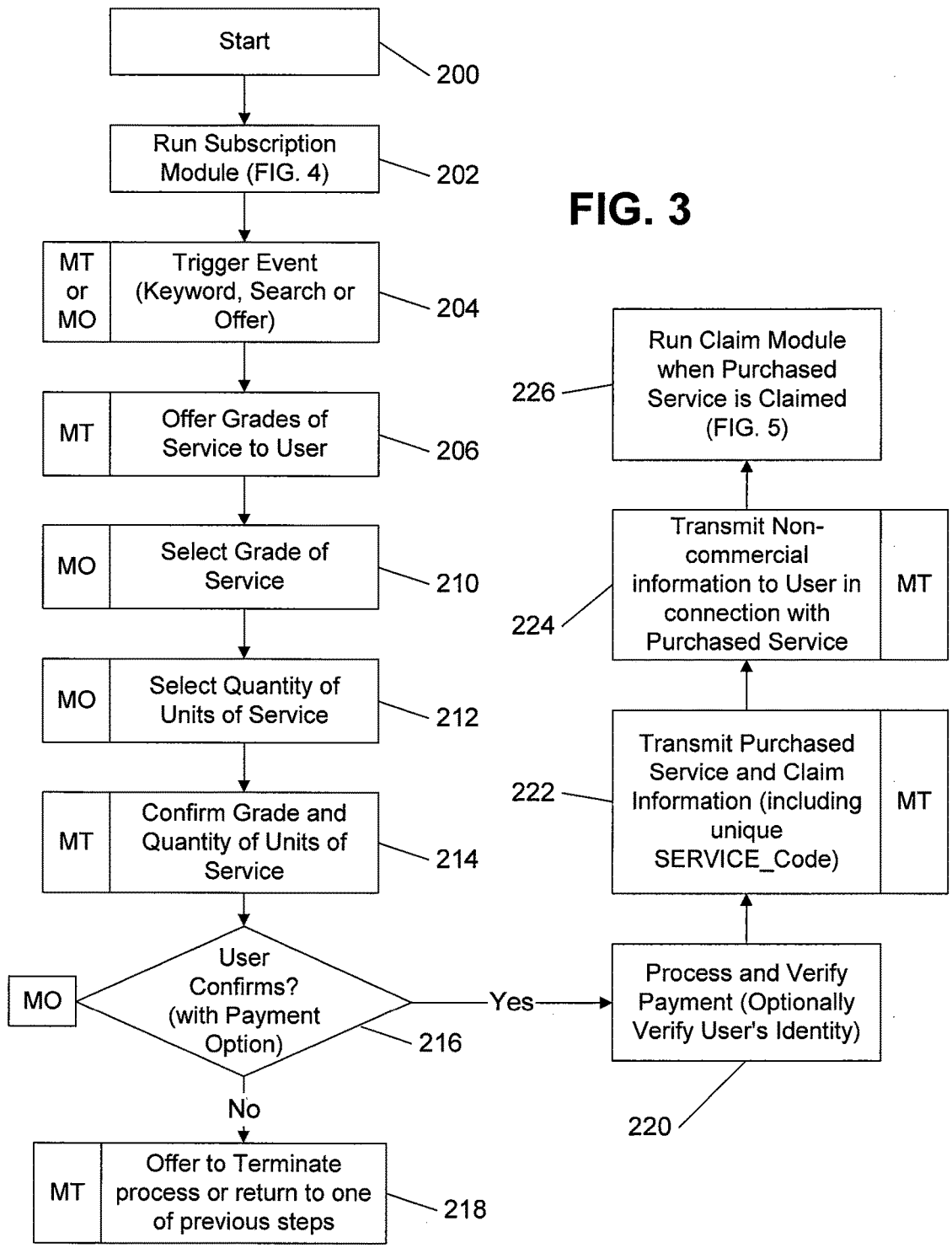
FIG. 3 is a flow process diagram showing an exemplary interactive service provision program process executed by the inventive wireless commercial service system of FIG. 1.

Referring now to FIG. 3, a logic flow diagram representing the main program executed by one or more components of the inventive system 10, in conjunction with input from the user, is shown. Furthermore, only a specific instance of the execution of the main program is described showing the operation of the system 10 during a typical dialog session between a user and the service system 22. The inventive system 10 can readily concurrently execute multiple instances of the main program for each user that connects to the system 10. Furthermore, only those steps necessary or desirable for system 10 operation are shown. It is contemplated that execution of application programs and functions across several different computer systems may involve numerous conventional processes and steps not shown here because they are not part of the present invention. It should also be noted that certain steps in the flow diagram are marked with an "MO" or "MT" to signify whether the step is originated from the user—mobile originated or "MO", or originated by the service system 22—mobile terminated or "MT".

Figure 7:
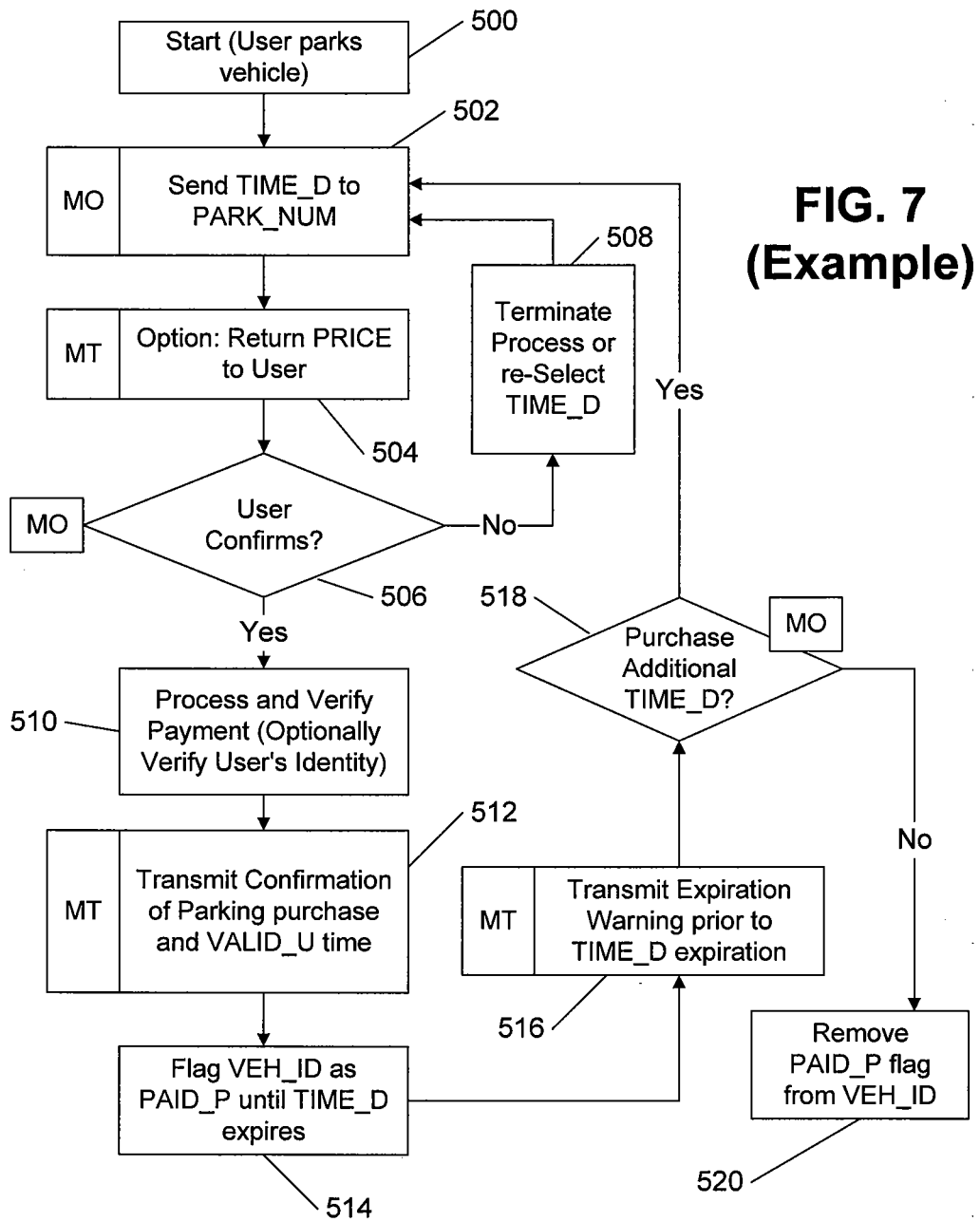
FIG. 7 is a flow process diagram showing a first part of an exemplary interactive service provision program process for providing parking payment services to users, executed by the inventive wireless commercial service system of FIG. 1.
Figure 8:
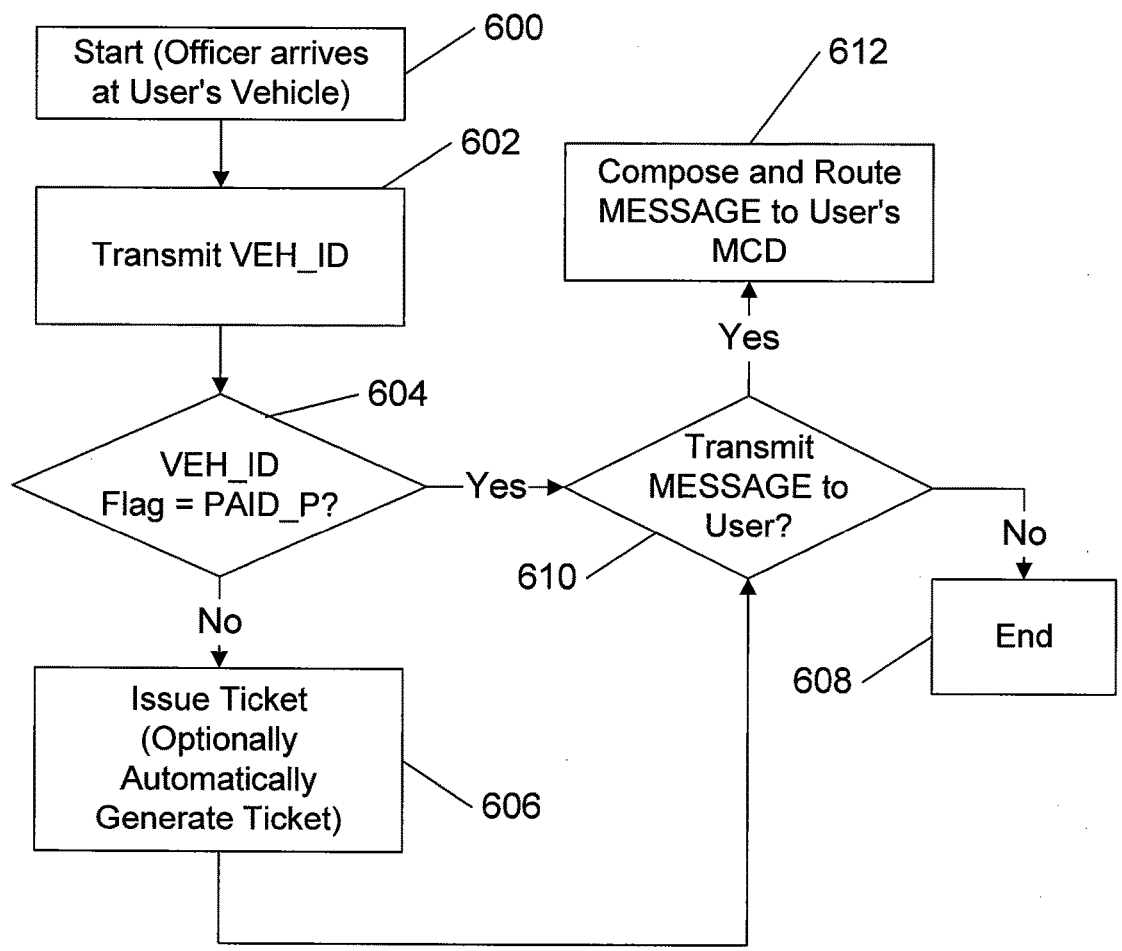
FIG. 8 is a flow process diagram showing a second part of the exemplary interactive service provision program process of FIG. 7, for providing parking payment services to users, executed by the inventive wireless commercial service system of FIG. 1.

It should also be noted that various modules and steps of the main program do not run continuously and may in fact be executed at completely different times. The main program is capable of supporting virtually any type of commercial service in its form presented below. However, the main program may be readily modified or configured to provide certain services more efficiently and with increased simplicity. An exemplary modification of the main program configured for providing parking purchase services is shown in FIGS. 7 and 8.

Figure 4:
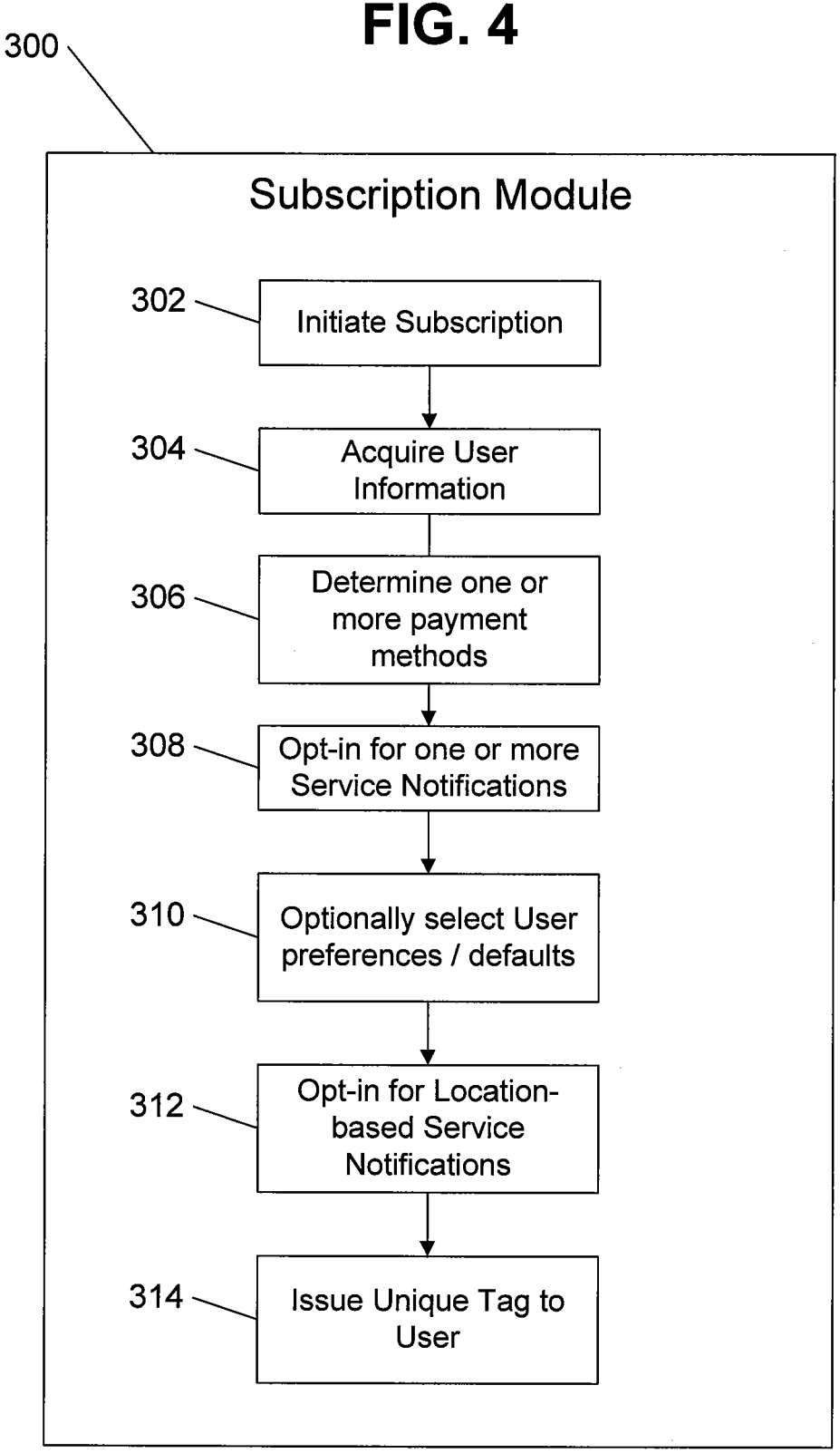
FIG. 4 is a flow process diagram showing a subscription program module utilized by the inventive program process of FIG. 3.

The main program begins at a step 200, and at a step 202, the program invokes a subscription module. The purpose of the subscription module is to run the subscription process 100 as described above in connection with FIG. 2, and thus steps 304 to 312 are performed with references to the descriptions of the subscription process 100. Referring now to FIG. 4, when the subscription module is invoked, at a step 302 the system 10 initiates subscription and at a step 304 acquires the necessary user information from the user. At a step 306, the system 10 queries the user to select one or more payment methods and acquires necessary information from the user to effectuate selected payments. At a step 308, the user optionally selects whether to opt-in for one or more service offer notifications, while at a step 310, the user optionally selects preference and defaults to simplify the service purchase process, and at a step 312, the user optionally selects location-based services. At an optional step 314, the user may be provided by the service provider, with a unique tag identifying the user as subscribing to a particular service and having some information (such as a vehicle identification (license plate, etc) linked to the unique tag identification). Optionally, the tag may include barcode, RF transmitter, or similar readable information device to enable reading of the tag identification automatically by a properly equipped reader. This is particularly useful for providing parking payment services, because such a tag may be displayed at the user's vehicle to identify to a traffic official that the user subscribes to a parking payment service and thus simplify the claim phase.

Returning now to FIG. 3, some time after the subscription module is executed, at a step 204, a particular service is selected by the user thus initiating a trigger event. The purpose of steps 204 to 222 is to execute the trigger dialog phase 102 described above in connection with FIG. 2, and thus the descriptions of these steps refer to the explanation of the trigger dialog phase 102. Returning to step 204, the trigger event can be a keyword, representative of a service and of service information, supplied by the user (and optionally supplemented with a search to narrow down the exact service details), a search for a particular service by the user, or a response to an offer from a service provider, assuming the user has opted in for such offers during execution of the subscription module of FIG. 4. At a step 206, the system 10 offers grades of service to the user (for example, the type of event tickets or the class of travel tickets), and at a step 212, the user selects the quantity of units of service (for example, the number of tickets, the number of time units for parking or the number of days for a car rental). At an optional step 214, the system 10 may confirm the user's selection of the services and at a test 216, if the user declines to confirm the purchase the program proceeds to a step 218 where the user is offered to terminate the purchase process or to return to a previous step (for example steps 210 or 212) to make new selections. If the user confirms the purchase, along with a default or selected payment option, at a step 220, the system 10 processes the user's payment and verifies its receipt. Optionally, prior to processing the payment, the system 10 may verify the user's identity by requesting a PIN number or by using a biometric identity verification device on the MCD 14 if such a device is present. Of course as described above, the user may disable the verification step during the subscription process. Alternately, the user may select to pay via a non-automated payment method (i.e., sending a check or calling in with a credit card). In this case step 220 is not performed after payment is received and performance of further steps is delayed until that occurs.

At a step 222, the system 10 transmits purchased service and claim information to the user, including a unique SERVICE_Code that will be used at a future time to claim the purchased service. The information transmitted at this step may include information of what service the user purchased (including grade and quantity), service location information where the service will be claimed, as well as other messages such as instructions on how to recover this message if the user accidentally deletes it.

Optionally, at some point prior to the time at which the service is to be claimed, the system 10 may transmit one or more non-commercial messages to the user having information in connection with the purchased service. For example, the message may include entry instructions, or even cancellation information if the event is cancelled.

Figure 5:
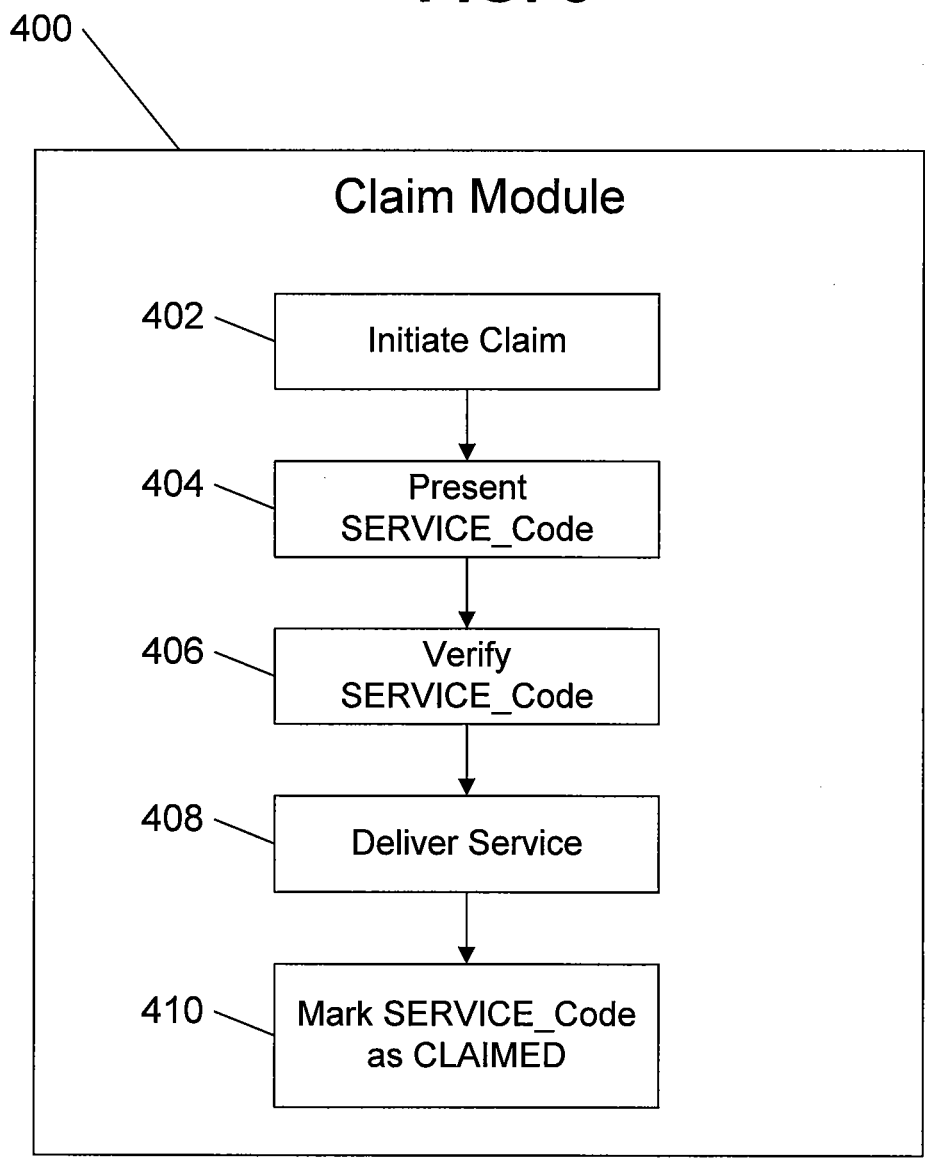
FIG. 5 is a flow process diagram showing a claim program module utilized by the inventive program process of FIG. 3.

Some time later, when the user desires to claim the purchased services, at a step 226, the program invokes a claim module. The purpose of the claim module is to run the claim dialog phase 106 as described above in connection with FIG. 2, and thus steps 402 to 410 are performed with references to the descriptions of the claim dialog phase 106. Referring now to FIG. 5, when the claim module is invoked, at a step 402, the system 10 initiates the claim process, and at a step 404, the user presents the SERVICE_Code to a service representative at the service location. At a step 406, the service representative verifies the SERVICE_Code using the remote terminal 46, and at a step 408, the service is delivered to the user (i.e. the user is admitted to an event, given boarding passes, or given a rental car or hotel room). At a step 410, the system 10 marks the SERVICE_Code as CLAIMED so that the same code cannot be used again for the same service. Thus, the user is able to readily purchase and claim commercial services utilizing the novel system 10 in conjunction with simplified SMS dialog processes.

In certain applications, the claim module may be modified to account for particulars of the service being purchased. For example, if the service is a parking payment, the user is not around to present a SERVICE_Code to a traffic agent. Instead, the SERVICE_Code may be implemented as a "PAID" flag on a parking account created by the user during execution of the subscription module and associated with the user's vehicle ID (see description of step 314 above) and the unique identification tag. In this case, the service is claimed when a traffic agent transmits information from the identification tag (or if no tag is present, the vehicle license plate number) to the service system 22 to determine if a PAID flag is present. Unlike other services, the parking payment SERVICE_Code (i.e. the "paid" status) lasts for a particular duration and is not disabled when "claimed". A more detailed exemplary embodiment of a parking embodiment of a main control program is described below in connection with FIGS. 7 and 8.

Figure 6:
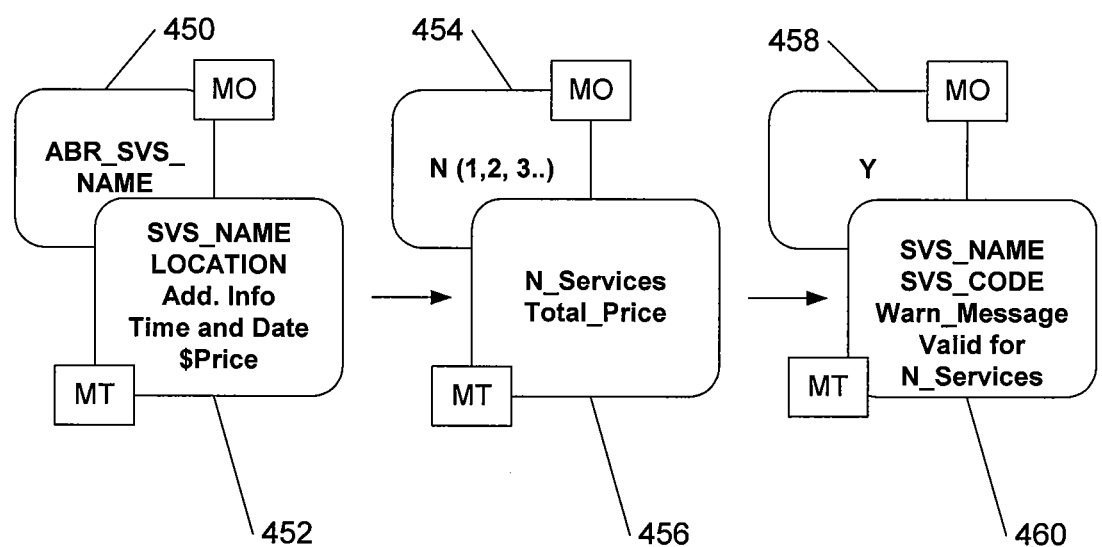
FIG. 6 is a block diagram of user interface screens of a mobile communication device component of a preferred embodiment of the service system of FIG. 1, showing an exemplary process for placing an order for a service utilizing the service system of FIG. 1.

Referring now to FIG. 6, a sequential series of exemplary MCD 14 screens are shown to illustrate a simplified exemplary interface of the system 10 for purchasing services. Each screen element is marked with an "MO" or "MT" to signify whether the information in the screen is sent from the user—mobile originated or "MO", or sent to the user by the service system 22—mobile terminated or "MT". At a screen 450 the user transmits a keyword from the MCD 14 identifying a desired commercial service in form of an ABR_SVS_NAME—for example an abbreviated name of a performance artist, or transportation tickets to a particular geographic location. This ABR_SVS_NAME may be obtained by the user from previous SMS offers, or from print or other media (TV, radio) advertising. The system 10 responds with a screen 452 displaying full information about the service (SVS_NAME—for example a concert name), the location of the service (LOCATION—for example a particular concert venue), as well as additional information, such as seats being offered (Add. Info), the time and date of the service, and the price per service ($Price—for example the price per concert ticket).

At a screen 454, the user transmits N, the number of services desired for purchase (i.e. a number of concert tickets), and at a screen 456, the system 10 returns a confirmation of the number of services to be purchased (N_Services) as well as the total purchase price (Total_Price). If the user desires to confirm the purchase, at a screen 458, the user transmits "Y" for "Yes" and then the system 10 verifies payment for the services by billing the user in accordance with a previously determined method (telephone bill, credit card, etc.). Optionally, in conjunction with purchase confirmation, the system 10 verifies the identity of the user via a pre-determined password or PIN code, or other form of identity verification (i.e. by voice verification or by a biometric scanner built into the MCD 14).

At a screen 460, the system 10 transmits purchase confirmation to the user in form of the SVS_NAME, a unique code serving as proof of the user's purchase (SVS_CODE), a warning message (Warn_Message—for example reminding the user not to delete this message and telling the user how to recover the message id accidentally deleted), and a statement of the amount of services (e.g. tickets) for which the SVS_CODE is valid. The user can then utilize the SVS_CODE to claim the purchased services by presenting the SVS_CODE at the predetermined LOCATION. As previously described, the SVS_CODE may include multiple bundled services (for example by offering additional services, such as parking, to the user during the above-described process), or may be utilized by the user to obtain discounts at service providers that made a previous cross-marketing or promotional arrangement with the service provider that issued the SVS_CODE. Furthermore, the SVS_CODE may be used for future marketing opportunities, for example sweepstakes, or as a basis for future service offers (discounted and otherwise) to the user.

Referring now to FIG. 7, an exemplary modification of the main control program executed by one or more components of the system 10 is shown as a process in two parts—purchase of parking time (FIG. 7) and validation of purchased parking (FIG. 8). While parking services may be readily implemented in the program of FIGS. 2-5, the example described below serves to illustrate how the inventive system 10 may be readily configured to provide various commercial services with the greatest efficiency and simplicity. The process described below presumes that the user has already subscribed to the parking payment service by completing the subscription module of FIG. 4 and that the user has their unique ID tag issued by the service provider displayed at their vehicle. In addition, during the subscription process at a step 304, the user should have provided vehicle identification (VEH_ID) to which the unique ID tag is linked by the system 10.

It should also be noted that for most parking applications (for example street parking, the user can (and likely should) opt to eliminate steps 504 to 508 (i.e. by making appropriate preference choices during the subscription process) and to eliminate the optional identity verification portion of a step 510, since these steps are unnecessary for parking purchases of no more than a few dollars. These optional steps may be useful for purchases of long terms parking, such as parking permits and airport parking.

The process begins at a step 500 when the user parks the car at a location at which parking services may be purchased through the system 10 (for example this may be noted with local signage, even providing a particular SMS telephone number—PARK_NUM to which purchase messages can be sent. At a step 502, the user transmits TIME_D—the desired time for parking in units of minutes, hours, days or longer, to the PARK_NUM. This step serves as both the trigger event and selection of number of units of service. If optional steps 504 to 508 are preformed, at a step 504, the system 10 confirms the purchase price of TIME_D with the user and if the user does not agree at a test 506, enables the user to terminate the process or re-select TIME_D at a step 506.

At a step 510, the system 10 optionally verifies the user's identity via PIN code or other means, and then processes and verifies payment for the TIME_D. At a step 512, the system 10 transmits confirmation of parking purchase to the user along with a "valid-until"—VALID_U time so that the user has a record of when the purchased TIME_D will run out. At a step 514, the system 10 flags the VEH_ID as having paid parking (PAID_P) until TIME_D expires at which time the PAID_P flag is removed from the VEH_ID at a step 520.

Depending on the service provider, additional optional steps 516-518 may be offered to the user to warn them of TIME_D running out and/or enable them to purchase additional TIME_D remotely. At a step 516 the system 10 transmits an expiration warning to the user a predetermined time before TIME_D runs out (for example 5 or 10 minutes). And at a test 518 the user is offered to purchase additional time. If the user accepts, at a step 502 the user can replenish TIME_D by a desired amount. If the user declines, after TIME_D expires, the program proceeds to the step 520 where the PAID_P flag is removed from the VEH_ID. Alternately, even if the notification step 516 is not used, the user can still repeat step 502 at any time to add to or purchase additional TIME_D. Thus, the user is able to purchase parking time in one easy step, retain verification and record of the purchase, as well as able to add to the purchased parking time remotely without returning to their vehicle.

Referring now to FIG. 8, the second part of the parking process is show as performed by a traffic officer utilizing their own MCD in communication with the system 10. In effect, this MCD acts as a remote terminal 46 communicating directly with the service system 22. Optionally, the traffic officer's MCD may be equipped with data reader to read data encoded in the unique ID tags (such as barcode or RF) and also optionally equipped with a printer to generate a parking ticket as required (not shown).

The process starts at a step 600 when the officer arrives at the user's vehicle. At a step 602 the officer transmits the VEH_ID to the service system 22. Preferably the officer acquires the VEH_ID by reading it from the unique ID tag at the vehicle with the remote terminal 46, or if the tag is not present by manually entering the license plate number of the vehicle into the remote terminal 46 as VEH_ID.

At a test 604, the system determines if the VEH_ID has a PAID_P flag. If it does not, the officer issues a ticket to the user's vehicle (optionally automatically generating it if the remote terminal 46 is equipped with a printer). At an optional test 610 the officer may determine whether he wants to send a message to the user, for example if the vehicle is damaged, a window is left open in the rain, or the vehicle lights are left on. If the message is to be sent, at a step 612, the message is composed (or preferably selected from predetermined messages, e.g. "your lights are on or "your windows are open") and then routed to the user by the service system 10. Otherwise, the process ends at a step 608.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A data processing and communication method for providing commercial services over a wireless communication network to a first user utilizing a mobile communication device (MCD), the method comprising:
    (a) receiving, via a service control system, subscription information from the first user, wherein the subscription information comprises an agreement to receive offers via the MCD;
    (b) detecting, via the service control system, a location of the MCD;
    (c) providing, via the service control system to the MCD, a first message comprising an offer for multiple bundled services corresponding, in part, to detected service locations within a determined geographic area of the detected location of the MCD, each of the multiple bundled services being different from one another and being redeemable at one or more venues, wherein the multiple bundled services offered by a service provider, and the multiple bundled services are automatically presented to a user interface of a display device of the MCD thereby enabling interaction by the first user, via the user interface, with visible indicia associated with the services wherein the first message is provided to the MCD based at least in part on the agreement with the first user, and the first message is provided to the MCD using at least one of a short message service (SMS) protocol or a multimedia message service (MMS) protocol,
    (d) receiving, via the service control system from the MCD, a second message comprising an acceptance of the offer, wherein the second message is received using at least one of an SMS protocol or an MMS protocol;
    (e) obtaining, via the service control system, payment for the multiple bundled services from the first user in response to the service control system verifying an identity of the first user based on a biometric scan of the first user scanned via a biometric identity verification device of the MCD;
    (f) providing, via the service control system to the MCD, a third message comprising a single unique confirmation code confirming purchase of the multiple bundled services, the confirmation code being usable for each service of the multiple bundled services, wherein the third message is provided using at least one of an SMS protocol or an MMS protocol;
    (g) analyzing, via the service control system, the confirmation code in response to detection of an indication of payment for the multiple bundled services to enable the first user to claim and utilize the multiple bundled services;
    (h) denoting, via the service control system, a first service of the multiple bundled services as claimed and in response preventing additional usage of the confirmation code by a second user in response to detecting that the confirmation code is verified in an instance in which the first service is provided to the first user; and
    (i) enabling, via the service control system, the confirmation code for usage by the first user to utilize the confirmation code, in part, to obtain a second service of the multiple bundled services prior to expiration of a predetermined time period subsequent to the first service being provided to the first user based on prior usage of the confirmation code to obtain the first service.

2. The data processing and communication method of claim 1, wherein the step of receiving, via the service control system, the subscription information from the first user further comprises: receiving, via the service control system, information representative of the first user.

3. The data processing and communication method of claim 1, wherein the step of receiving, via the service control system, the subscription information from the first user further comprises: receiving, via the service control system, a payment type selected by the first user such that payment for the offer is obtained utilizing the selected payment type.

4. The data processing and communication method of claim 1, wherein step (a) further comprises selecting at least one default preference, wherein the at least one default preference comprises a specification of whether the control system should request identity verification prior to processing a purchase of the multiple bundled services.

5. The data processing and communication method of claim 1, wherein the third message contains information representative of the multiple bundled services and instructions for claiming the multiple bundled services.

6. The data processing and communication method of claim 1, wherein the step of verifying the confirmation code utilizes a local communication device in communication with the service control system.

7. The data processing and communication method of claim 1, wherein the multiple bundled services comprise at least one service selected from the following group: movies, concerts, cultural events, sporting events, zoos, amusement parks, premium speaking engagements, travel tickets, car rentals, hotel rooms, and parking.

8. The data processing and communication method of claim 1, wherein the step of providing the offer for multiple bundled services to the first user, via the service control system, is triggered by receiving, via the control system from the first user, a keyword corresponding to a least one of the multiple bundled services.

9. The data processing and communication method of claim 1, further comprising providing, via the service control system, to the first user, a time until which the confirmation code is valid.

10. A computer program product comprising a non-transitory computer readable medium encoded with program code to provide commercial services over a wireless communication network to a first user utilizing a mobile communication device (MCD), the program code comprising:
   code for receiving, via a service control system, subscription information from the first user, wherein the subscription information comprises an agreement to receive offers via the MCD;
   code for detecting, via the service control system, a location of the MCD;
   code for providing, via the service control system to the MCD, a first message comprising an offer for multiple bundled services corresponding, in part, to detected service locations within a determined geographic area of the detected location of the MCD, each of the multiple bundled services being different from one another and being redeemable at one or more venues, wherein the multiple bundled services offered by a service provider and the multiple bundled services are automatically presented to a user interface of a display device of the MCD thereby enabling interaction by the first user via the user interface with visible indicia associated with the services, wherein (a) the first message is provided to the MCD based at least in part on the agreement with the first user, and (b) the first message is provided to the MCD using at least one of a short message service (SMS) protocol or a multimedia message service (MMS) protocol;
   code for receiving, via the service control system from the MCD, a second message comprising an acceptance of the offer, wherein the second message is received using at least one of an SMS protocol or an MMS protocol;
   code for obtaining, via the service control system, payment for the multiple bundled services from the first user in response to verifying an identity of the first user based on a biometric scan captured via a biometric identity verification device of the MCD;
   code for providing, via the service control system to the MCD, a third message comprising a unique confirmation code confirming purchase of the multiple bundled services, the confirmation code being usable for each service of the multiple bundled services, wherein the third message is provided using at least one of an SMS protocol or an MMS protocol;
   code for analyzing, via the service control system, the confirmation code in response to detection of an indication of payment for the multiple bundled services to enable the first user to claim and utilize the multiple bundled services;
   code for denoting, via the service control system, a first service of the multiple bundled services as claimed and in response preventing additional usage of the confirmation code by a second user in response to detecting that the confirmation code is verified in an instance in which the first service is provided to the first user; and
   code for enabling, via the service control system, the confirmation code for usage by the first user to utilize the confirmation code, in part, to obtain a second service of the multiple bundled services prior to expiration of a predetermined time period subsequent to the first service is provided to the first user based on prior usage of the confirmation code to obtain the first service.

11. The computer program product of claim 10, wherein the program code further comprises:
   code for receiving said confirmation code from the first user to a service representative at a service claim location in an instance in which the first user decides to claim said purchased service code for verifying, by the service representative using a local communication device communicating with said service control system, validity of said confirmation code; and code providing the purchased service to the first user in an instance in which said confirmation code is valid.

12. The computer program product of claim 11, wherein:
   denoting comprises marking, via the service control system, the confirmation code as claimed to prevent future utilization of said confirmation code to claim said purchased service.

13. The computer program product of claim 10, wherein the program code further comprises code for transmitting, to the first user, a time until which the selected service is valid.

14. The computer program product of claim 10, wherein the program code further comprises: code for receiving a subscription, by the first user, to a service program offered by said service provider prior to receiving, at a service control system, a selection of a service, wherein the subscription information further comprises at least one default preference, and wherein the at least one default preference comprises a specification of whether or not the control system should request identity verification prior to processing a purchase of the multiple bundled services.

15. A data processing and communication method for providing commercial services over a wireless communication network to a first user utilizing a mobile communication device (MCD), the method comprising:
   (a) providing, to a service control system, subscription information by the first user, wherein the subscription information comprises an agreement to receive offers via the MCD,
   (b) detecting a location of the MCD;
   (c) receiving, via the MCD, a first message comprising an offer for multiple bundled services corresponding, in part, to detected service locations within a determined geographic area of the detected location of the MCD, each of the multiple bundled services being different from one another and being redeemable at one or more venues, wherein the multiple bundled services are offered by a service provider and the multiple bundled services are automatically presented to a user interface of a display device of the MCD to enable interaction by the first user, via the user interface, with visible indicia associated with the multiple bundled services, wherein the message is received by the MCD based at least in part on the agreement with the first user, and (b) the first message is received via the MCD using at least one of a short message service (SMS) protocol or a multimedia message service
(MMS) protocol;
(d) providing, via the MCD to the service control system, a second message comprising an acceptance of the offer, wherein the second message is provided using at least one of an SMS protocol or an MMS protocol,
(e) receiving, via the MCD, a third message comprising a unique confirmation code confirming purchase of the multiple bundled services subsequent to the service control system obtaining payment for the multiple bundled services from the first user and in response to verifying an identity of the first user based on a biometric scan captured via a biometric identity verification device of the MCD;
(f) determining, via the MCD, whether the service code is valid in response to detection of an indication of payment for the multiple bundled services to enable the first user to claim and utilize the multiple bundled services; and
(g) denoting a first service of the multiple bundled services as claimed and disabling the confirmation code for the first service to prevent additional usage of the confirmation code by a second user in response to a detection that the confirmation code is verified in an instance in which the first service is provided to the first user, wherein the confirmation code is enabled, via the service control system, for usage by the first user to utilize the confirmation code, in part, to obtain a second service of the multiple bundled services prior to expiration of a predetermined time period subsequent to the first service being provided to the first user based on prior usage of the confirmation code to obtain the first service.

16. The data processing and communication method of claim 15, further comprising selecting, by the first user, at least one service parameter for the multiple bundled services included in the offer.

17. The data processing and communication method of claim 16, wherein said at least one service parameter comprises at least one of: grade of service, and quantity of service.

18. The data processing and communication method of claim 1, wherein prior to enabling the confirmation code, the method further comprises:
transmitting, via the service control system, an expiration warning to the MCD at a predefined time period before the expiration of the predetermined time period.

19. The computer program product of claim 10, wherein prior to the code for enabling the confirmation code, the computer program product further comprises:
code for transmitting, via the service control system, an expiration warning to the MCD at a predefined time period before the expiration of the predetermined time period.

20. The data processing and communication method of claim 15, wherein prior to the confirmation code is enabled for usage, the method further comprises:
(j) receiving, via the MCD, an expiration warning, from the service control system, at a predefined time period before the expiration of the predetermined time period.

* * * * *